United States Patent
Uraya et al.

(10) Patent No.: US 12,422,591 B2
(45) Date of Patent: Sep. 23, 2025

(54) LIQUID DISPERSION OF FLUORIDE PARTICLES AND METHOD FOR PRODUCING SAME, AND OPTICAL FILM

(71) Applicant: STELLA CHEMIFA CORPORATION, Osaka (JP)

(72) Inventors: Masanori Uraya, Osaka (JP); Hiroya Yamamoto, Osaka (JP); Rui Hasebe, Osaka (JP); Megumi Tomisaki, Osaka (JP); Tetsuo Nishida, Osaka (JP)

(73) Assignee: STELLA CHEMIFA CORPORATION (JP)

( * ) Notice: Subject to any disclaimer, the term of this patent is extended or adjusted under 35 U.S.C. 154(b) by 634 days.

(21) Appl. No.: 17/788,140

(22) PCT Filed: Nov. 11, 2020

(86) PCT No.: PCT/JP2020/042043
§ 371 (c)(1),
(2) Date: Jun. 22, 2022

(87) PCT Pub. No.: WO2021/131368
PCT Pub. Date: Jul. 1, 2021

(65) Prior Publication Data
US 2023/0038554 A1    Feb. 9, 2023

(30) Foreign Application Priority Data
Dec. 27, 2019  (JP) ................ 2019-239321

(51) Int. Cl.
G02B 1/111 (2015.01)
G02B 1/11 (2015.01)
C01B 33/10 (2006.01)

(52) U.S. Cl.
CPC .......... *G02B 1/111* (2013.01); *G02B 1/11* (2013.01); *C01B 33/10* (2013.01); *C01P 2004/64* (2013.01)

(58) Field of Classification Search
USPC ........................................ 359/581
See application file for complete search history.

(56) References Cited

U.S. PATENT DOCUMENTS

| | | | |
|---|---|---|---|
| 4,374,111 A | 2/1983 | Lefrancois | 423/347 |
| 5,147,435 A | 9/1992 | Kubota et al. | 65/30.1 |
| 6,234,377 B1 | 5/2001 | Teshima et al. | 228/183 |
| 6,475,598 B1* | 11/2002 | Naoe | G11B 5/7085 428/323 |
| 2009/0285993 A1* | 11/2009 | Kang | G02B 1/111 427/380 |
| 2013/0095024 A1 | 4/2013 | Chen et al. | 423/298 |
| 2015/0225569 A1 | 8/2015 | Kameno et al. | |
| 2020/0301207 A1 | 9/2020 | Yoshikawa et al. | |

FOREIGN PATENT DOCUMENTS

| | | |
|---|---|---|
| EP | 2857357 A1 | 4/2015 |
| JP | 57-118016 A | 7/1982 |
| JP | H04-031342 U | 3/1992 |
| JP | 2000-015481 A | 1/2000 |
| JP | 2007-161509 A | 6/2007 |
| JP | 4655614 B2 | 3/2011 |
| JP | 2011-195693 A | 10/2011 |
| JP | 4986426 B2 | 7/2012 |
| JP | 2015-108096 A | 6/2015 |
| JP | 5943754 B2 | 7/2016 |
| JP | 4046921 B2 | 2/2018 |
| WO | WO 2017/159720 A1 | 9/2017 |

OTHER PUBLICATIONS

Chinese Office Action dated Sep. 21, 2023, issued in corresponding Chinese Patent Application No. 202080081279.4, with English machine translation of framed part.
Lihuang Huang, Flotation, Metallurgical Industry Press, Beijing, pp. 85-86, Mar. 31, 2018, with English machine translation of framed part.
Tianjin Chemical Industry Research Institute of Ministry of Chemical Industry, Chemical Product Brochure—Inorganic Chemical Products, Chemical Industry Press, Beijing, p. 146, Oct. 31, 1993, with English machine translation of framed part.
Extended European Search Report dated May 31, 2023 issued in corresponding European Patent Application No. 20905802.3.
International Search Report mailed Jan. 19, 2021 in corresponding PCT International Application No. PCT/JP2020/042043.
Written Opinion mailed Jan. 19, 2021 in corresponding PCT International Application No. PCT/JP2020/042043.
Office Action mailed Jul. 2, 2024 for corresponding Japanese Patent Application No. 2020-186796 with English translation.

* cited by examiner

*Primary Examiner* — Dung T Nguyen
(74) *Attorney, Agent, or Firm* — OSTROLENK FABER LLP

(57) ABSTRACT

Provided are a liquid dispersion of fluoride particles, which has low viscosity and excellent dispersibility, and is suitable for producing an optical film such as an antireflection film; a method for producing the same; and an optical film using the same. The liquid dispersion of fluoride particles according to the present invention is that in which particles of a fluoride represented by the chemical formula $A_xCF_y$ (wherein A represents sodium or potassium, C represents silicon or boron, x is 1 or 2, and y is 4 or 6) are dispersed in an aprotic organic solvent having a relative permittivity of 5 to 40, and the optical film according to the present invention is produced by using the liquid dispersion of fluoride particles.

13 Claims, No Drawings

LIQUID DISPERSION OF FLUORIDE PARTICLES AND METHOD FOR PRODUCING SAME, AND OPTICAL FILM

CROSS-REFERENCE TO RELATED APPLICATIONS

The present application is a 35 U.S.C. §§ 371 national stage application of International Application No. PCT/JP2020/042043, filed Nov. 11, 2020, which claims priority to JP 2019-239321, filed Dec. 27, 2019, the contents of which are incorporated by this reference.

TECHNICAL FIELD

The present invention relates to a liquid dispersion of fluoride particles and an optical film, and more particularly to a liquid dispersion of fluoride particles, which is suitable for an antireflection film of displays, lenses and the like, a method for producing the same, and an optical film.

BACKGROUND ART

In the present day, people have many opportunities to come into contact with various displays of televisions, personal computers, smartphones, tablet computers, and car navigation systems. When the display is illuminated with light, irrespective of it being indoors or outdoors, light reflection reduces visibility and may cause eye fatigue and headaches. In recent years, in order to add an air of luxury to decorative panels and the like in automobiles, coating capable of preventing light reflection has come into use.

The coating for preventing light reflection is composed of a high refractive index layer and a low refractive index layer. The coating for preventing light reflection prevents light reflection on a display surface by utilizing the phase difference of light reflected on the surface of both the high refractive index layer and the low refractive index layer, leading to an improvement in visibility.

The methods for forming the low refractive index layer are roughly classified into vapor phase methods and coating methods. Of these, from a mass-production and equipment cost perspective, coating methods have good raw material utilization efficiency and are superior to vapor phase methods. Therefore, at present, a high productivity coating method is used for forming the low refractive index layer.

Patent Document 1 mentions that a magnesium fluoride sol or magnesium fluoride fine powder, which is chemically stable and has a low refractive index, is effective as a filler of a coating agent for forming a low refractive index layer. However, the refractive index of magnesium fluoride is about 1.38, and the refractive index of the low refractive index layer cannot be reduced below that point.

Patent Document 2 mentions a liquid dispersion of hollow spherical silica-based fine particles. Patent Document 3 also mentions a liquid dispersion in which hollow particles (core-shell particles) having a hollow core are dispersed inside a shell made of magnesium fluoride. These patent documents mention that silica-based fine particles and hollow particles are used as a filler of a coating agent to form an antireflection film having the lowest refractive index. However, the silica-based fine particles of Patent Document 2 and the hollow particles of Patent Document 3 themselves have voids. Therefore, the antireflection film using these particles as the filler presents a problem of deteriorating mechanical strength and scratch resistance.

Patent Document 4 mentions that potassium hexafluorosilicate (refractive index of 1.34), which has a lower refractive index than that of magnesium fluoride, is used as a filler for an antireflection film. However, when potassium hexafluorosilicate is dispersed in an organic solvent under an atmospheric pressure environment, the viscosity of the liquid dispersion significantly increases. There is also a problem that particles of potassium hexafluorosilicate aggregate and the light transmittance is impaired.

Patent Document 5 mentions a fluoride fine particle liquid dispersion in which fine particles of magnesium fluoride are dispersed in carboxylic acid. Patent Document 5 also mentions that the moisture content in the fluoride fine particle liquid dispersion is suppressed to 0.1% by weight or less. However, Patent Document 5 does not disclose fluorides other than magnesium fluoride. Further, about 3% by weight of a carboxylic anhydride such as acetic anhydride used to remove moisture remains in the fluoride fine particle liquid dispersion, and considering that the content of fine particles of magnesium fluoride is about 4 to 8% by weight, a large amount of the carboxylic anhydride remains in the fluoride fine particle liquid dispersion. When the fluoride fine particle liquid dispersion is used for forming the low refractive index layer, there is no description of the light transmission properties of the low refractive index layer and no study has been done.

PRIOR ART DOCUMENTS

Patent Documents

Patent Document 1: JP 4655614 B2
Patent Document 2: JP 4046921 B2
Patent Document 3: JP 5943754 B2
Patent Document 4: JP 2011-195693 A
Patent Document 5: JP 2007-161509 A

SUMMARY OF THE INVENTION

Problems to be Solved by the Invention

The present invention has been made in view of the above problems, and an object thereof is to provide a liquid dispersion of fluoride particles, which has low viscosity and excellent dispersibility, and is suitable for producing an optical film such as an antireflection film, a method for producing the same, and an optical film using the same.

Solutions to the Problems

In order to solve the above problems, the liquid dispersion of fluoride particles of the present invention is characterized in that particles of a fluoride represented by the chemical formula $A_xCF_y$ (wherein A represents sodium or potassium, C represents silicon or boron, x is 1 or 2, and y is 4 or 6) are dispersed in an aprotic organic solvent having a relative permittivity of 5 to 40.

In the constitution described above, it is preferable that the moisture concentration [a] (% by mass) in the liquid dispersion of fluoride particles relative to 100% by mass of the liquid dispersion of fluoride particles and the relative permittivity [b] of the aprotic organic solvent satisfy the relationship represented by the following inequality (1).

$$[a] \leq 0.06 e^{0.15[b]} \quad (1)$$

In the constitution described above, it is preferable that the aprotic organic solvent is at least one selected from the group consisting of a ketone solvent, an amine solvent, an ether solvent and an ester solvent.

In the constitution described above, it is preferable that the ketone solvent is at least one selected from the group consisting of methyl isobutyl ketone, methyl ethyl ketone, methyl butyl ketone, cyclohexanone, methylcyclohexanone and acetylacetone.

In the constitution described above, it is preferable that the amine solvent is at least one selected from the group consisting of N-methyl-2-pyrrolidone, N,N-dimethylformamide, N,N-dimethylacetamide and tetramethyl urea.

In the constitution described above, it is preferable that the ether solvent is at least one selected from the group consisting of ethylene glycol dimethyl ether, propylene glycol monomethyl ether acetate and tetrahydrofuran.

In the constitution described above, it is preferable that the ester solvent is at least one selected from the group consisting of methyl acetate, ethyl acetate, butyl acetate and isobutyl acetate.

In the constitution described above, it is preferable that the liquid dispersion of fluoride particles contains a dispersant for dispersing the particles of the fluoride in the aprotic organic solvent.

In the constitution described above, it is preferable that the average dispersion particle size of the particles of the fluoride is in the range of 1 nm to 100 nm.

In the constitution described above, it is preferable that the content of the particles of the fluoride is in the range of 1% by mass to 30% by mass relative to 100% by mass of the liquid dispersion of fluoride particles.

In order to solve the above problems, the method for producing a liquid dispersion of fluoride particles is characterized by including the steps of: reacting an aqueous sodium salt solution or an aqueous potassium salt solution with a silicofluoride or a borofluoride to obtain a slurry of fluoride particles represented by $A_xCF_y$ (wherein A represents sodium or potassium, C represents silicon or boron, x is 1 or 2, and y is 4 or 6); subjecting the slurry of fluoride particles to solid-liquid separation, and washing the resulting solid component of fluoride particles; drying the washed solid component of fluoride particles; and dispersing the dried fluoride particles in an aprotic organic solvent having a relative permittivity of 5 to 40, thereby generating a liquid dispersion of fluoride particles.

In the constitution described above, it is preferable that the step of generating the liquid dispersion of fluoride particles is performed by adjusting the moisture concentration [a] in the liquid dispersion relative to 100% by mass of the liquid dispersion of fluoride particles so that the moisture concentration [a] (% by mass) in the liquid dispersion of fluoride particles and the relative permittivity [b] of the aprotic organic solvent satisfy the relationship represented by the following inequality (1).

$$[a] \leq 0.06 e^{0.15[b]} \quad (1)$$

In the constitution described above, it is preferable that the moisture concentration [a] in the liquid dispersion is adjusted by generating the liquid dispersion of fluoride particles in an atmosphere of inert gas.

In order to solve the above problems, the optical film of the present invention is characterized by including a dry cured film of a composition for forming an optical film containing the liquid dispersion of fluoride particles.

Effects of the Invention

The present invention can provide a liquid dispersion of fluoride particles, which has low viscosity and excellent dispersibility, and has a refractive index smaller than, for example, that of magnesium fluoride; and a method for producing the same. By using the liquid dispersion of fluoride, it is possible to provide an optical film such as an antireflection film, which has uniform and satisfactory optical characteristics such as light transmittance, haze, and light reflectance in the plane.

EMBODIMENT OF THE INVENTION (Liquid Dispersion of Fluoride Particles)

The dispersion of fluoride particles according to the present embodiment (hereinafter sometimes referred to as "liquid dispersion") will be described below.

The liquid dispersion of the present embodiment contains at least particles of a fluoride and an aprotic organic solvent. As used herein, "liquid dispersion" refers to a state where a dispersoid is dispersed in a liquid dispersion medium. Therefore, the "liquid dispersion" does not contain a dispersion such as a solid colloid (organogel) in which the dispersoid is dispersed in a solid dispersion medium to lose the fluidity.

The fluoride is represented by the chemical formula: $A_xCF_y$ (wherein A represents sodium or potassium, C represents silicon or boron, x is 1 or 2, and y is 4 or 6).

Specifically, the fluorides represented by the chemical formula are, for example, sodium hexafluorosilicate ($Na_2SiF_6$, refractive index of 1.31), potassium hexafluorosilicate ($K_2SiF_6$, refractive index 1.34), sodium fluoroborate ($NaBF_4$, refractive index of 1.31) and potassium fluoroborate ($KBF_4$, refractive index of 1.33). The exemplified fluorides can be used alone or in a mixture of two or more thereof. Of the exemplified fluorides, sodium hexafluorosilicate and sodium tetrafluoroborate, which have a refractive index of less than 1.33 and low solubility in water, are particularly preferable.

The average dispersion particle size of fluoride particles is preferably in the range of 1 nm to 100 nm, more preferably 10 nm to 50 nm. By setting the average dispersion particle size at 1 nm or more, it is possible to suppress distinct aggregation of the fluoride particles due to intermolecular force. Meanwhile, by setting the average dispersion particle size at 100 nm or less, for example, when fluoride particles are used as a filler for an optical film such as an antireflection film, it is possible to reduce desorption of the fluoride particles from the optical film and deterioration of the light transparency.

The content of fluoride particles is preferably in the range of 1% by mass to 30% by mass, more preferably 2% by mass to 15% by mass, and still more preferably 5% by mass to 10% by mass, relative to 100% by mass of the liquid dispersion of fluoride particles. By setting the content of the fluoride particles at 1% by mass or more, it is possible to suppress the use of a large amount of the liquid dispersion, for example, when mixing with a resin composition which is a constituent material of the optical film. As a result, even when the aprotic organic solvent is removed in the film formation process of the optical film, the time required for removal can be reduced. Meanwhile, by setting the content of the fluoride particles at 30% by mass or less, it is possible to suppress extension of the dispersion time of fluoride particles and to reduce the probability that the fluoride particles aggregate with each other.

The aprotic organic solvent is an organic solvent having no proton-donating property, and may be either polar or non-polar.

The relative permittivity of the aprotic organic solvent is in the range of 5 to 40, and preferably 5 to 20.

Examples of the aprotic organic solvent include at least one selected from the group consisting of a ketone solvent, an amine solvent, an ether solvent and an ester solvent.

Examples of the ketone solvent include, but are not particularly limited to, methyl isobutyl ketone (relative permittivity of 13.1), methyl ethyl ketone (relative permittivity of 18.5), methyl butyl ketone (relative permittivity of 14.5), cyclohexanone (relative permittivity of 16.1), methylcyclohexanone (relative permittivity of 16.4), acetylacetone (relative permittivity of 27.2) and the like.

Examples of the amine solvent include, but are not particularly limited to, N-methyl-2-pyrrolidone (relative permittivity of 32.2), N,N-dimethylformamide (relative permittivity of 36.7), N,N-dimethylacetamide (relative permittivity of 37.8), tetramethyl urea (relative permittivity of 23.1) and the like.

Examples of the ether solvent include, but are not particularly limited to, ethylene glycol dimethyl ether (relative permittivity of 7.2), propylene glycol monomethyl ether acetate (relative permittivity of 8.3), tetrahydrofuran (relative permittivity of 7.6) and the like.

Examples of the ester solvent include, but are not particularly limited to, methyl acetate (relative permittivity of 6.7), ethyl acetate (relative permittivity of 6.4), butyl acetate (relative permittivity of 5.0), isobutyl acetate (relative permittivity of 5.3) and the like.

Of these aprotic organic solvents, methyl ethyl ketone and methyl isobutyl ketone have excellent solubility in an acrylate solvent and relatively highly volatile, and are therefore suitable for producing an optical film such as an antireflection film. The exemplified aprotic organic solvent can be used alone, or two or more thereof can be used as a mixture.

It is preferable that the moisture concentration [a] contained in the liquid dispersion (concentration (% by mass) relative to 100% by mass of the water dispersion contained in the liquid dispersion) and the relative permittivity [b] of the aprotic organic solvent satisfy the relationship represented by the following inequality (1).

$$[a] \leq 0.06 e^{0.15[b]} \quad (1)$$

By ensuring that the moisture concentration [a] of the liquid dispersion and the relative permittivity [b] of the aprotic organic solvent satisfy the relationship represented by the above inequality (1), in the present invention, it becomes possible to specify the moisture concentration in the liquid dispersion in an appropriate range according to the value of the relative permittivity of the aprotic organic solvent, that is, according to the type of the aprotic organic solvent. As mentioned above, according to the present invention, by specifying the moisture concentration of the liquid dispersion according to the type of aprotic organic solvent, rather than uniformly specifying the moisture concentration below a specific value, it is possible to suppress aggregation of fluoride particles for each aprotic organic solvent, thus obtaining a liquid dispersion having excellent dispersibility.

By setting the value of the moisture concentration [a] in the liquid dispersion at the value, which is equal to or less than $0.06 e^{0.15[b]}$, it is possible to suppress an excessive increase in viscosity of the liquid dispersion and to satisfactorily maintain the dispersibility of fluoride particles. It is also possible to prevent the compatibility with the resin composition, which is a constituent material of the optical film, from deteriorating and to prevent the fluoride particles from coarsening. As a result, the light transparency of the optical film can be satisfactorily maintained.

It is necessary to maintain performances such as dispersibility of the liquid dispersion for a long period of time immediately after production. Therefore, the relationship between the moisture concentration [a] and the relative permittivity [b] of the aprotic organic solvent satisfies more preferably the relationship represented by the following inequality (2), and still more preferably the relationship represented by the following inequality (3).

$$[a] \leq 0.045 e^{0.15[b]} \quad (2)$$

$$[a] \leq 0.03 e^{0.15[b]} \quad (3)$$

The dispersion can contain a dispersant to satisfactorily disperse fluoride particles in the aprotic organic solvent. The addition of the dispersant is particularly effective when an organic solvent having low polarity is used as the aprotic organic solvent.

The dispersant is not particularly limited, and common surfactants can be used. Examples of the surfactant include nonionic hydrocarbon surfactants, cationic hydrocarbon surfactants, anionic hydrocarbon surfactants, nonionic fluorocarbon surfactants, cationic fluorocarbon surfactants and anionic fluorocarbon surfactants.

Of the exemplified surfactants, those imparting satisfactory dispersibility to fluoride particles include anionic hydrocarbon surfactants and anionic fluorocarbon surfactants each having an acidic functional group. Examples of the type of the acidic functional group include the carboxyl group, the phosphoric acid group and the sulfonic acid group.

Of the exemplified surfactants, surfactants having a fluorine atom, that is, nonionic fluorocarbon surfactants, cationic fluorocarbon surfactants and anionic fluorocarbon surfactants have low refractive index, so that the liquid dispersion containing these surfactants is suitable as a constituent material for the optical film.

Examples of the surfactant having a fluorine atom include, but are not particularly limited to, acrylic resins obtained by copolymerizing with fluoroalkyl (meth)acrylates which have a fluoroalkyl group having 1 to 20 carbon atoms, an ethylenically unsaturated monomer having an acidic functional group, and if necessary, other ethylenically unsaturated monomers. (Meth)acrylate denotes that both an acrylate and a methacrylate are included.

Examples of the fluoroalkyl (meth)acrylates which has a fluoroalkyl group having 1 to 20 carbon atoms include, but are not particularly limited to, 2,2,2-trifluoroethyl (meth) acrylate, 2,2,3,3,3-pentafluoropropyl (meth)acrylate, 2-(perfluorobutyl)ethyl (meth)acrylate, 3-(perfluorohexyl)ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl) ethyl (meth)acrylate, 1H,1H,3H-tetrafluoropropyl (meth) acrylate, 1H,1H,5H,octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl)trifluoroethyl (meth)acrylate, 1H,1H,3H-hexafluorobutyl (meth)acrylate, and the like.

As the dispersant, commercially available surfactants can be used. As the dispersant having an acidic functional group, it is possible to use, for example, Solsperse (registered trademark) 3000, Solsperse 21000, Solsperse 26000, Solsperse 36600 and Solsperse 41000 (all of which are trade names, manufactured by Lubrizol Japan Limited); DISPERBYK 108, DISPERBYK 110, DISPERBYK 111, DISPERBYK 112, DISPERBYK 116, DISPERBYK 142, DIS- PERBYK 180, DISPERBYK 2000 and DISPERBYK 2001 (all of which are trade names, manufactured by BYK-Chemie); PLYSURF (registered trademark) A208N, PLYSURF A208F, PLYSURF A208B, PLYSURF A219B, PLYSURF AL, PLYSURF A212C and PLYSURF A215C (trade name, manufactured by Dai-ichi Kogyo Seiyaku Co., Ltd.); Disparon (registered trademark) 3600N and Disparon 1850 (both of which are product names, manufactured by Kusumoto Chemicals, Ltd.); PA111 (trade name, manufactured by Ajinomoto Fine-Techno Co., Inc.); EFKA4401 and EFKA4550 (both of which are product names, manufactured by EFKA Additives) and the like. However, commercially available surfactants are not limited to those exemplified above.

The concentration of the dispersant is preferably in the range of 0.05% by mass to 5% by mass, and more preferably in the range of 0.5% by mass to 1% by mass, relative to 100% by mass of the dispersion. When the concentration of the dispersant is 0.05% by mass or more, the dispersibility of fluoride particles can be further improved. Meanwhile, when the concentration of the dispersant is 5% by mass or less, it is possible to suppress deterioration of the dispersibility of fluoride particles by forming micelles of the dispersant itself The viscosity of the liquid dispersion is preferably in the range of 200 mPa·s or less from the viewpoint of improving the compatibility with the binder component contained in the composition for forming an optical film (details will be described later).

(Method for Producing Fluoride Particles)

Next, the method for producing fluoride particles according to the present embodiment will be described below. The production method described below is an example, and the present invention is not limited to this production method.

The method for producing fluoride particles include the steps of reacting an aqueous sodium salt solution or an aqueous potassium salt solution (hereinafter referred to as "aqueous sodium salt solution" or the like) with silicofluoride or borofluoride (hereinafter referred to as "silicofluoride or the like"), thereby obtaining a slurry of fluoride particles represented by the above $A_xCF_y$; performing solid-liquid separation of the resulting slurry and washing of a solid component of the slurry; and drying the solid component (paste) of the washed fluoride particles, thereby removing moisture.

Examples of the sodium salt in the aqueous sodium salt solution include, but are not particularly limited to, sodium chloride, sodium sulfate, sodium acetate, sodium nitrate and sodium hydroxide. These sodium salts can be used alone, or two or more thereof can be used as a mixture.

Examples of the potassium salt in the aqueous potassium salt solution include, but are not particularly limited to, potassium chloride, potassium sulfate, potassium acetate, potassium nitrate and potassium hydroxide. These potassium salts can be used alone, or two or more thereof can be used as a mixture.

The aqueous sodium salt solution and the aqueous potassium salt solution are obtained by dissolving the sodium salt or the potassium salt (hereinafter referred to as "sodium salt or the like") in water, respectively. When dissolving the sodium salt or the like in water, the dissolution temperature can be appropriately set according to the solubility of the sodium salt or the like in water. For example, when using the sodium salt or the like, which exhibits sufficient solubility in water at room temperature, the salt may be dissolved at room temperature. When using the sodium salt or the like which has low solubility in water at room temperature, the sodium salt or the like may be dissolved in water by heating to shorten the time required for dissolution.

The silicofluoride is not particularly limited as long as it is a salt which exhibits the solubility in water. Examples of the silicofluoride include sodium hexafluorosilicate, potassium hexafluorosilicate, ammonium silicofluoride and hydrosilicofluoric acid. These silicofluorides can be used alone, or two or more thereof can be used as a mixture.

The borofluoride is not particularly limited as long as it is a salt which exhibits solubility in water. Examples of the borofluoride include sodium fluoroborate, potassium fluoroborate, ammonium tetrafluoroborate and tetrafluoroboric acid. These borofluorides can be used alone, or two or more thereof can be used as a mixture.

The reaction between the aqueous sodium salt solution or the like and the silicofluoride or the like may be performed after filtering the aqueous sodium salt solution or the like for the purpose of removing foreign substances contained in the aqueous sodium salt solution or the like.

Regarding the reaction between the aqueous sodium salt solution or the like and the silicofluoride or the like, a solid silicofluoride or the like may be added to the aqueous sodium salt solution or the like for reaction, or the reaction may be performed by mixing the aqueous sodium salt solution or the like with an aqueous solution the silicofluoride or the like prepared by dissolving the silicofluoride or the like in water. In the latter case, the production process can be simplified and the reaction can be facilitated. When an aqueous solution of the silicofluoride or the like is used, filtration may be performed in advance in order to remove foreign substances such as the silicofluoride or the like in the aqueous solution.

There is no particular limitation on the temperature of the reaction between the aqueous sodium salt solution or the like and the silicofluoride or the like. However, when the reaction temperature is too low, the progress of the reaction may be slowed. Meanwhile, when the reaction temperature is too high, steam may be generated from the aqueous solution such as the aqueous sodium salt solution or the like and/or the aqueous solution of the silicofluoride or the like, leading to a change in the concentration of a mixed solution (reaction solution) thereof. From these viewpoints, the reaction temperature is preferably in the range of 20° C. to 50° C.

Examples of the method for solid-liquid separation of the resulting fluoride particle slurry include, but are not particularly limited to, suction filtration and centrifugal dehydration. When the particle size of fluoride particles is small and fine, it may be sometimes difficult to perform solid-liquid separation by suction filtration or centrifugal dehydration. In such a case, solid-liquid separation may be performed using a centrifuge, or the slurry itself may be evaporated to dryness.

The fluoride particle paste obtained by solid-liquid separation can be washed, for example, with water. This makes it possible to remove the unreacted silicofluoride and other anions. The washing temperature and washing time are not particularly limited, and can be appropriately set as needed.

Examples of the method for removing moisture from the paste of fluoride particles after washing include a heat treatment or the like. This makes it possible to obtain a dry powder of fluoride particles. Examples of the heat treatment method include, but are not particularly limited to, a method in which a paste of fluoride particles is placed in a tray made of FRP and dried in a drying oven.

The heating temperature (drying temperature) during the heat treatment is preferably in the range of 100° C. to 300° C., and more preferably 100° C. to 200° C. By setting the heating temperature at 100° C. or higher, the moisture contained in the paste of fluoride particles can be sufficiently removed or reduced. Meanwhile, by setting the heating temperature at 300° C. or lower, it is possible to prevent thermal fusion between fluoride particles and thermal decomposition of the fluoride particles. The heating time (drying time) during the heat treatment is not particularly limited, and can be appropriately set as needed.

The heat treatment may be performed in the atmosphere or in an inert gas environment. Examples of the inert gas include, but are not particularly limited to, nitrogen, argon and the like. In terms of accelerating the drying of the paste of fluoride particles, the heat treatment may be performed in a reduced pressure environment.

(Method for Producing Liquid Dispersion of Fluoride Particles)

Next, the method for producing a liquid dispersion of fluoride particles according to the present embodiment will be described below.

The liquid dispersion of the present embodiment can be obtained by adding fluoride particles obtained by the above-mentioned production method to an aprotic organic solvent and dispersing the fluoride particles in the aprotic organic solvent. The above-mentioned method for producing fluoride particles can be included in the method for producing a liquid dispersion of fluoride particles according to the present embodiment.

Examples of the method for dispersing fluoride particles in an aprotic organic solvent include, but are not particularly limited to, methods using a wet bead mill, a wet jet mill, ultrasonic waves, and the like. In the dispersion method, an apparatus used for pulverization may be selected in consideration of the average dispersion particle size of the target fluoride particles and qualities such as purity.

For example, when it is desired to improve the dispersibility of fluoride particles, a method using a wet bead mill is preferable. In a wet bead mill, the particles are made finer by using a medium such as zirconia beads, thus making possible an improvement in the dispersion force of the fluoride particles. However, the resulting dispersion may be contaminated by media. When it is desired to improve the purity of the liquid dispersion, a method using a wet jet mill is preferable. The method using the wet jet mill is a wet pulverization method using no medium, and is capable of preventing contamination by a medium such as a wet bead mill. However, since no medium is used, the dispersion force of the fluoride particles may decrease.

In the process of producing the liquid dispersion, it is preferable to control the moisture concentration [a] in the liquid dispersion. Specifically, it is preferable that the moisture concentration [a] in the liquid dispersion satisfies the relationship represented by the above inequality (1). Examples of the method for controlling the moisture concentration [a] include a method in which wet pulverization is performed in a place where the dew point is controlled, such as a dry room, and a method in which the moisture concentration is controlled in an environment of inert gas or dry air in a closed space so that fluoride particles, an aprotic organic solvent and a liquid dispersion containing them are not exposed to the outside air. Examples of the inert gas include, but are not particularly limited to, nitrogen, argon, and the like.

Surface-adsorbed water of fluoride particles may be removed in advance before the fluoride particles are added and dispersed in the aprotic organic solvent. Examples of the method for removing the surface-adsorbed water include a method in which drying is performed at a drying temperature of 100° C. to 200° C. and a drying time in the range of 2 hours to 34 hours, and preferably 5 hours to 20 hours. Examples of the method for removing moisture from the aprotic organic solvent include distillation, centrifugation, and use of dehydrating materials (molecular sieves, zeolite, ion exchange resin, activated alumina and the like). The method of bubbling inert gas such as nitrogen in an aprotic organic solvent may also be used.

(Composition for Forming Optical Film)

Next, the composition for forming an optical film according to the present embodiment will be described below.

The composition for forming an optical film of the present embodiment contains at least a liquid dispersion of fluoride particles and a binder component.

The content of the liquid dispersion and the binder component is not particularly limited and can be appropriately set as needed.

Examples of the binder component include, but are not particularly limited to, a resin, a polymerizable monomer and the like.

The resin is not particularly limited, and known thermosetting resins, thermoplastic resins and the like can be used. More specifically, examples thereof include an acrylic resin, a polyester resin, a polycarbonate resin, a polyamide resin, a urethane resin, a vinyl chloride resin, a fluororesin, a silicone resin, an epoxy resin, a melamine resin, a phenol resin, a butyral resin, a vinyl acetate resin and the like. These resins can be used alone, or two or more thereof can be used as a mixture. It is also possible to use as a copolymer or a modified product composed of two or more resins. Of the exemplified resins, a resin containing a fluorine atom, such as a fluororesin is preferable because the refractive index of the optical film can be reduced.

The polymerizable monomer is not particularly limited, and a known monomer capable of being polymerized by radical polymerization, anionic polymerization, cationic polymerization or the like can be used. More specifically, examples thereof include nonionic monomers (styrene, methyl methacrylate, 2-hydroxyethyl acrylate and the like), anionic monomers (methacrylic acid, maleic acid, itaconic acid, 2-acrylamide-2-methylpropanesulfonic acid, o- and p-styrene sulfonates, and salts thereof), cationic monomers (N-(3-acrylamidepropyl)ammonium methacrylate, N-(2-methacryloyloxyethyl)-N, 1,2-dimethyl-5-vinylpyridinium methosulfate, and salts thereof), crosslinked monomers (divinylbenzene, ethylene diacrylate, N,N-methylenebisacrylamide and the like) and the like. These polymerizable monomers can be used alone, or two or more thereof can be used as a mixture. Of the exemplified polymerizable monomers, a polymerizable monomer having a fluorine atom is preferable because the refractive index of the optical film can be reduced.

The composition for forming an optical film may contain other additives as long as the object and effect of the present invention are not impaired. Examples of other additives include photopolymerization initiators, photocurable compounds, polymerization inhibitors, photosensitizers, leveling agents, surfactants, antibacterial agents, antiblocking agents, plasticizers, ultraviolet absorbers, infrared absorbents, antioxidants, silane coupling agents, conductive polymers, conductive surfactants, inorganic fillers, pigments, dyes and the like. The amount of these additives added can be appropriately set as needed.

(Method for Producing Optical Film)

Next, the optical film and the method for producing the same according to the present embodiment will be described below.

The optical film of the present embodiment comprises a dry cured film of the above-mentioned composition for forming an optical film. Fluoride particles as a filler are uniformly contained in this optical film, and the optical film has low refractive index as compared with, for example, an optical film using magnesium fluoride. The optical film has uniform and satisfactory optical properties in the plane, such as high light transmittance, reduced haze and reduced light reflectance.

The optical film of the present embodiment can be used as, for example, an antireflection film or the like.

The content of fluoride particles contained in the optical film is preferably in the range of 20% by mass to 90% by mass relative to 100% by mass of the optical film. It is practical when the content of the fluoride particles is in the above range, because the effect of reducing the refractive index of the optical film can be maintained while suppressing a decrease in physical and chemical strength of the optical film.

The thickness of the optical film is not particularly limited, and can be set as needed.

The optical film can be formed, for example, by the following method. That is, the composition for forming an optical film is coated on a substrate or the like, and then the coating film of the optical film forming composition is dried. Subsequently, the dried coating film is photocured by irradiating with ultraviolet rays having a predetermined light intensity. As a result, the optical film of the present embodiment is obtained.

Examples of the method for coating the composition for forming an optical film include, but are not particularly limited to, a dipping method, a spray method, a spinner (spin coating) method, a roll coating method, a reverse coating method, a gravure coating method, a rod coating method, a bar coating method, a die coat method, spray coating method and the like. When a low refractive index layer is formed, a reverse coating method, particularly a reverse coating method using a small diameter gravure roll is preferable from the viewpoint of coating accuracy.

Examples of the substrate include, but are not particularly limited to, a plastic sheet, a plastic film, a plastic panel and glass. Examples of the material constituting the plastic sheet, the plastic film and the plastic panel include, but are not particularly limited to, polycarbonate, acrylic resin, polyethylene terephthalate (PET) and triacetyl cellulose (TAC).

The composition for forming an optical film may be further coated on a substrate in a state of being added to a solvent. The solvent is mixed for the purpose of improving the workability of coating (including printing). The solvent is not particularly limited as long as it dissolves the composition for forming an optical film, or the composition for forming an optical film exhibits the compatibility, and known solvents can be used.

The amount of the solvent used is not particularly limited as long as it is in the range suitable for forming an optical film, but is usually in the range of 10% by mass to 95% by mass relative to 100% by mass of the composition for forming an optical film.

The method for drying a coating film of the composition for forming an optical film coated on the substrate is not particularly limited, and the drying can be performed by natural drying or blowing hot air or the like. The drying time and the drying temperature are not particularly limited, and can be appropriately set according to the thickness of the coating film, the constituent materials and the like.

There is no particular limitation on the method of irradiating the dried coating film with ultraviolet rays and the irradiation conditions. The irradiation conditions can be appropriately set according to the type and the mixing amount of the constituent components of the composition for forming an optical film.

As mentioned above, the optical film of the present embodiment can be formed on the substrate. Here, the liquid dispersion of fluoride particles of the present embodiment has low viscosity and also has satisfactory dispersibility of fluoride particles. Therefore, the optical film formed by using the composition for forming an optical film, which contains the liquid dispersion, has low refractive index, and optical properties such as light transmittance, haze and light reflectance are uniform in the plane. Therefore, the optical film of the present embodiment is suitable for an antireflection film or the like.

EXAMPLES

Suitable Examples of the present invention will be described in detail below. However, materials or mixing amounts mentioned in these Examples do not purport to limit the scope of the present invention only to these unless there is a definitive description.

[Measurement Method of Average Particle Size]

Using a particle size distribution measuring instrument (Microtrac, Nanotrac UPA, UPA-UZ152, manufactured by MicrotracBEL Corp.), the average particle size of fluoride particles in the liquid dispersion was measured. It is noted that the average particle size (d50) is a particle size defined by the fact that particles having an average dispersion particle size or less accounts for 50% by volume of the entire sample particles.

Measurement principle: dynamic light scattering frequency analysis (FFT-heterodyne method).
Light source: 3 mW, two semiconductor lasers of 780 nm
Set temperature range: 10° C. to 80° C.
Particle size distribution measuring range: 0.8 nm to 6.5406
Measurement target: colloidal particles Unless otherwise specified, each average particle size in Examples and Comparative Examples means a volume-equivalent average particle size measured by the above dynamic light scattering method.

(Moisture Measurement Method)

The moisture concentration in the liquid dispersion of fluoride particles was measured by the Karl Fischer method. A TQV-2200S (trade name) manufactured by Hiranuma Sangyo Co., Ltd. was used as the moisture measuring device. The measurement method was the volumetric titration method based on JIS K 0068 (2001).

(Viscosity Measuring Method)

The viscosity of the liquid dispersion of fluoride particles was measured using a B-type viscometer. As the B-type viscometer, a DV-I PRIME (trade name) manufactured by Brookfield, USA was used. The measurement was performed based on JIS K 5600-2-2 (2004).

Example 1

In a 500 cc container made of fluororesin, 190 g of methyl ethyl ketone (reagent), 10 g of sodium hexafluorosilicate (manufactured by Stella Chemifa Corporation) and 2 g of PLYSURF A212C (trade name, manufactured by Dai-ichi Kogyo Seiyaku Co., Ltd.) as a dispersant were mixed to generate a slurry in which sodium hexafluorosilicate was aggregated. Next, the slurry was charged in a bead mill (manufactured by SHINMARU ENTERPRISES CORPO- RATION) in a nitrogen environment at a dew point of −40° C. or lower, and then a dispersion treatment was performed. Zirconia beads (manufactured by NIKKATO CORPORATION) were used. During the dispersion treatment, the liquid dispersion was sampled at regular intervals to measure the particle size distribution. The dispersion treatment was performed until the average dispersion particle size (volume-equivalent, d50) of the sodium hexafluorosilicate particles stopped decreasing, thus obtaining 180 g of a liquid dispersion of sodium hexafluorosilicate particles (particle concentration: 5% by mass relative to the total mass of the liquid dispersion). The physical properties of the liquid dispersion according to Example 1 are shown in Table 1.

Example 2

A liquid dispersion according to the present Example was obtained in the same manner as in Example 1, except that N-methyl-2-pyrrolidone (NMP) was used in place of methyl ethyl ketone. The physical properties of the liquid dispersion thus obtained are shown in Table 1.

Comparative Example 1

In the present Comparative Example, the dispersion treatment in a nitrogen environment was replaced by a dispersion treatment in an atmospheric environment (room temperature of 25° C., relative humidity of 60%). A gel-like dispersion according to the present Comparative Example was obtained in the same manner as in Example 1, except for the above. The physical characteristics of the dispersion thus obtained are shown in Table 1.

Comparative Example 2

In this Comparative Example, isopropanol (IPA, protic organic solvent) was used in place of methyl ethyl ketone, and no dispersant was used. A liquid dispersion according to the present Comparative Example was obtained in the same manner as in Example 1, except for the above. The physical characteristics of the liquid dispersion thus obtained are shown in Table 1.

Comparative Example 3

In this Comparative Example, 1-Methoxy-2-propanol (PGME, protic organic solvent) was used in place of methyl ethyl ketone, and no dispersant was used. A liquid dispersion according to the present Comparative Example was obtained in the same manner as in Example 1, except for the above. The physical characteristics of the liquid dispersion thus obtained are shown in Table 1.

Example 3

7.3 g of the liquid dispersion produced in Example 1 and 2.9 g of a commercially available acrylate paint were mixed. Further, 0.37 g of 1-hydroxycyclohexyl phenyl ketone was dissolved in the mixed solution to obtain a composition for forming an optical film. Next, 0.1 g of this composition for forming an optical film was diluted with 99.9 g of propylene glycol monomethyl ether to produce a low refractive index paint.

500 μl of the diluted low refractive index paint was coated on one surface of a PET film (Lumilar (registered trademark) U34: thickness of 100 μm, manufactured by Toray Industries, Inc.) by spin coating. The coating film was dried at 130° C. and photocured by irradiation with ultraviolet rays at 400 mJ/cm$^2$, and then an antireflection film (low refractive index layer, optical film) was laminated.

Example 4

0.01 g of 1-hydroxycyclohexyl phenyl ketone was dissolved in 0.18 g of a commercially available acrylate paint. Further, 3.10 g of the liquid dispersion produced in Example 1 was mixed with the mixed solution to obtain a composition for forming an optical film. Next, 3.3 g of this composition for forming an optical film was diluted with 6.72 g of propylene glycol monomethyl ether to produce a low refractive index paint.

300 μl of the diluted low refractive index paint was coated on one surface of a PET film (Lumilar (registered trademark) T60: thickness of 100 μm, manufactured by Toray Industries, Inc.) by spin coating. The coating film was dried at 130° C. and photocured by irradiation with ultraviolet rays at 400 mJ/cm$^2$, and then an antireflection film (low refractive index layer, optical film) was laminated.

Example 5

In this Example, the liquid dispersion produced in Example 2 was used in place of the liquid dispersion produced in Example 1. An antireflection film according to the present Example was laminated in the same manner as in Example 4, except for the above.

Comparative Example 4

In this Comparative Example, the dispersion produced in Comparative Example was used in place of the liquid dispersion produced in Example 1. An antireflection film according to the present Example was laminated in the same manner as in Example 3, except for the above.

TABLE 1

| | Fluoride particles | Organic solvent | Dispersant | Moisture concentration (% by mass) | Viscosity (mPa · s) | Average dispersion particle size (nm) |
|---|---|---|---|---|---|---|
| Example 1 | $Na_2SiF_6$ | MEK | PLYSURFA212C | 0.08 | 0.77 | 34 |
| Example 2 | $Na_2SiF_6$ | NMP | None | 0.08 | 34 | 53 |
| Comparative Example 1 | $Na_2SiF_6$ | MEK | PLYSURFA212C | 1.40 | Unmeasurable | 212 |
| Comparative Example 2 | $Na_2SiF_6$ | IPA | PLYSURFA212C | 0.05 | 140 | 3,420 |
| Comparative Example 3 | $Na_2SiF_6$ | PGME | None | 0.06 | 81 | 1,070 |

Comparative Example 5

In this Comparative Example, the dispersion produced in Comparative Example was used in place of the liquid dispersion produced in Example 1. An antireflection film according to the present Example was laminated in the same manner as in Example 4, except for the above.

(Haze Measurement, Total Light Transmittance Measurement and Minimum Light Reflectance Measurement)

Using an ultraviolet-visible near-infrared spectrophotometer (trade name: V670, manufactured by JASCO Corporation), the haze value of the antireflection film (low reflectance layer), the total light transmittance of the low refractive index layer, and the minimum light reflectance of the antireflection film (low refractive index layer) were measured in accordance with JIS K 7136.

The physical properties of the antireflection films according to Examples 3 to 5 and Comparative Examples 4 and 5 are shown in Table 2. Each of the numerical values of Examples 3 to 5 and Comparative Example 5 in Table 2 indicates the relative value to the reference value, with optical properties (reference value) of the antireflection film of Comparative Example 4 being 100. Regarding the total light transmittance in Table 2, the higher the numerical value, the better the optical properties of the antireflection film. Regarding the haze and the minimum light reflectance, the smaller the numerical value, the better the optical properties of the antireflection film.

TABLE 2

| | Liquid dispersion | Concentration (% by mass) of fluoride particles contained in antireflection film | Total light transmittance | Haze | Minimum light reflectance |
|---|---|---|---|---|---|
| Example 3 | Liquid dispersion of Example 1 | 20 | 110 | 13 | 47 |
| Example 4 | Liquid dispersion of Example 1 | 50 | 116 | 3 | 20 |
| Example 5 | Liquid dispersion of Example 2 | 50 | 97 | 16 | 68 |
| Comparative Example 4 | Liquid dispersion of Comparative Example 1 | 20 | 100 | 100 | 100 |
| Comparative Example 5 | Liquid dispersion of Comparative Example 1 | 50 | 98 | 25 | 42 |

The invention claimed is:

1. A liquid dispersion of fluoride particles wherein particles of a fluoride represented by the chemical formula $A_xCF_y$ (wherein A represents sodium or potassium, C represents silicon or boron, x is 1 or 2, and y is 4 or 6) are dispersed in an aprotic organic solvent having a relative permittivity of 5 to 40, and
the moisture concentration [a] (% by mass) in the liquid dispersion of fluoride particles relative to 100% by mass of the liquid dispersion of fluoride particles and the relative permittivity [b] of the aprotic organic solvent satisfy the relationship represented by the following inequality (1).

$$[a] \leq 0.06 e^{0.15[b]} \quad (1)$$

2. The liquid dispersion of fluoride particles according to claim 1, wherein the aprotic organic solvent is at least one selected from the group consisting of a ketone solvent, an amine solvent, an ether solvent and an ester solvent.

3. The liquid dispersion of fluoride particles according to claim 2, wherein the ketone solvent is at least one selected from the group consisting of methyl isobutyl ketone, methyl ethyl ketone, methyl butyl ketone, cyclohexanone, methylcyclohexanone and acetylacetone.

4. The liquid dispersion of fluoride particles according to claim 2, wherein the amine solvent is at least one selected from the group consisting of N-methyl-2-pyrrolidone, N,N-dimethylformamide, N,N-dimethylacetamide and tetramethyl urea.

5. The liquid dispersion of fluoride particles according to claim 2, wherein the ether solvent is at least one selected from the group consisting of ethylene glycol dimethyl ether, propylene glycol monomethyl ether acetate and tetrahydrofuran.

6. The liquid dispersion of fluoride particles according to claim 2, wherein the ester solvent is at least one selected from the group consisting of methyl acetate, ethyl acetate, butyl acetate and isobutyl acetate.

7. The liquid dispersion of fluoride particles according to claim 1, which contains a dispersant for dispersing the particles of the fluoride in the aprotic organic solvent.

8. The liquid dispersion of fluoride particles according to claim 1, wherein the average dispersion particle size of the particles of the fluoride is in the range of 1 nm to 100 nm.

9. The liquid dispersion of fluoride particles according to claim 1, wherein the content of the particles of the fluoride is in the range of 1% by mass to 30% by mass relative to 100% by mass of the liquid dispersion of fluoride particles.

10. An optical film comprising a dry cured film of a composition for forming an optical film containing the liquid dispersion of fluoride particles according to claim 1.

11. The liquid dispersion of fluoride particles according to claim 1, wherein the aprotic organic solvent is at least one selected from the group consisting of a ketone solvent, an amine solvent, an ether solvent and an ester solvent.

12. A method for producing a liquid dispersion of fluoride particles, which comprises the steps of:
reacting an aqueous sodium salt solution or an aqueous potassium salt solution with a silicofluoride or a borofluoride, thereby obtaining a slurry of fluoride particles represented by $A_xCF_y$ (wherein A represents sodium or potassium, C represents silicon or boron, x is 1 or 2, and y is 4 or 6);
subjecting the slurry of fluoride particles to solid-liquid separation, and washing the resulting solid component of fluoride particles;
drying the washed solid component of fluoride particles; and dispersing the dried fluoride particles in an aprotic organic solvent having a relative permittivity of 5 to 40, thereby generating a liquid dispersion of fluoride particles, the step of generating the liquid dispersion of fluoride particles is performed by adjusting the moisture concentration [a] in the liquid dispersion relative to 100% by mass of the liquid dispersion of fluoride particles so that the moisture concentration [a] (% by mass) in the liquid dispersion of fluoride particles and the relative permittivity [b] of the aprotic organic solvent satisfy the relationship represented by the following inequality (1).

$$[a] \leq 0.06e^{0.15[b]} \quad (1)$$

13. The method for producing a dispersion of fluoride particles according to claim 12, wherein the moisture concentration [a] in the liquid dispersion is adjusted by generating the liquid dispersion of fluoride particles in an atmosphere of inert gas.

* * * * *